United States Patent
Li et al.

(10) Patent No.: US 8,606,272 B2
(45) Date of Patent: Dec. 10, 2013

(54) TECHNIQUES FOR IDENTIFYING BASE STATIONS IN COMMUNICATION SYSTEM

(75) Inventors: Ying Li, Garland, TX (US); Anshuman Nigam, Karnataka (IN); Jung Je Son, Yongin-shi (KR); Zhouyue Pi, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 306 days.

(21) Appl. No.: 12/871,354

(22) Filed: Aug. 30, 2010
(Under 37 CFR 1.47)

(65) Prior Publication Data
US 2011/0212729 A1  Sep. 1, 2011

Related U.S. Application Data

(60) Provisional application No. 61/275,755, filed on Sep. 2, 2009, provisional application No. 61/280,672, filed on Nov. 6, 2009.

(51) Int. Cl.
*H04W 4/02* (2009.01)

(52) U.S. Cl.
USPC ..................... 455/435.2; 455/456.6

(58) Field of Classification Search
USPC .......... 370/328, 338; 455/436–439, 450, 434, 455/435.1, 435.2, 456.6, 464
See application file for complete search history.

(56) References Cited

U.S. PATENT DOCUMENTS

| | | | |
|---|---|---|---|
| 2008/0267153 A1* | 10/2008 | Mukherjee et al. | 370/338 |
| 2009/0042595 A1 | 2/2009 | Yavuz et al. | |
| 2009/0047960 A1* | 2/2009 | Gunnarsson et al. | 455/436 |
| 2009/0270096 A1* | 10/2009 | Somasundaram et al. | 455/434 |
| 2010/0056160 A1* | 3/2010 | Kim et al. | 455/444 |
| 2010/0085867 A1* | 4/2010 | Ji et al. | 370/216 |
| 2010/0153816 A1* | 6/2010 | Li et al. | 714/758 |
| 2011/0009095 A1* | 1/2011 | Uemura et al. | 455/411 |
| 2011/0151859 A1* | 6/2011 | Lee et al. | 455/422.1 |
| 2011/0201354 A1* | 8/2011 | Park et al. | 455/456.1 |
| 2011/0212731 A1* | 9/2011 | Lee et al. | 455/450 |
| 2011/0256850 A1* | 10/2011 | Selander et al. | 455/411 |
| 2011/0269460 A1* | 11/2011 | Dalsgaard et al. | 455/435.1 |
| 2012/0021725 A1* | 1/2012 | Rune | 455/411 |

FOREIGN PATENT DOCUMENTS

| | | |
|---|---|---|
| EP | 2 077 685 A1 | 7/2009 |
| KR | 10-2009-0061550 A | 6/2009 |

* cited by examiner

*Primary Examiner* — Cong Tran
(74) *Attorney, Agent, or Firm* — Jefferson IP Law, LLP

(57) ABSTRACT

A method and a Mobile Station (MS), for use in a wireless communication network comprising a plurality of Base Stations (BSs) capable of communicating with a plurality of MSs, wherein at least some of the BSs are Femtocell BSs (FBSs) and at least some of the BSs are Macrocell BSs (MBSs), for identifying the BSs at the MS, are provided. The method includes receiving at least one of a globally unique BS ID and an Operator ID from an FBS via a Broadcast CHannel (BCH), deriving a Closed Subscriber Group IDentifier (CSG ID) from the received at least one of the globally unique BS ID and the Operator ID, and determining, based on the derived CSG ID, if the FBS is a CSG FBS to which the MS is subscribed.

24 Claims, 8 Drawing Sheets

TECHNIQUES FOR IDENTIFYING BASE STATIONS IN COMMUNICATION SYSTEM

CROSS-REFERENCE TO RELATED APPLICATION

This application claims the benefit under 35 U.S.C. §119(e) of a U.S. Provisional application filed on Sep. 2, 2009 in the U.S. Patent and Trademark Office and assigned Ser. No. 61/275,755, and a U.S. Provisional application filed on Nov. 6, 2009 in the U.S. Patent and Trademark Office and assigned Ser. No. 61/280,671, the entire disclosure of each of which are hereby incorporated by reference.

BACKGROUND OF THE INVENTION

1. Field of the Invention

The present invention relates to techniques for use in communication a system. More particularly, the present invention relates to techniques for identifying base stations in a communication system.

2. Description of the Related Art

In a typical wireless communication system, a service, such as a voice and/or data service, is provided to Mobile Stations (MSs) through a plurality of Macrocell Base Stations (MBSs). An MS may also be referred to as an Advanced Mobile Station (AMS) and an MBS may also be referred to as a Macrocell Advanced Base Station (MABS). Each of the MBSs is responsible for providing a service to MSs located within their respective service coverage area. The service coverage area of an MBS is hereafter referred to as a Macrocell. To facilitate mobility of the MSs, handoff between MBSs is performed when the MS leaves one Macrocell for another.

In the wireless communication system, a channel may deteriorate due to a number of factors, including a geographical factor inside a Macrocell, a distance between an MS and an MBS, movement of the MS, etc. The channel deterioration is problematic since it may result in a disruption of communication between the MS and the MBS. For example, when the MS is located inside a structure, such as an office building or a house, a channel between the MBS and the MS may deteriorate due a shadow region that is formed by the structure. A shadow region formed within the structure is hereafter referred to as an indoor shadow region. The MS located in the indoor shadow region may not be able to adequately perform communication with the MBS. Further, an MBS may have inadequate capacity to service all users in its Macrocell. To address the shortcomings of the MBS, a variety of other Base Stations (BSs) have been proposed, including a Relay, Picocell, Microcell, Femtocell, Ubicell etc. The Femtocell concept, as an example of a BS other than an MBS, will be explained further below.

The Femtocell concept is proposed to provide ubiquitous connectivity to MSs and improve wireless capacity, while addressing a service limitation of an indoor shadow region. A Femtocell is a small cell coverage area that is serviced by a low power Femtocell BS (FBS) that accesses a wireless communication Core Network (CN) via a commercial broadband network or via a wireless connection to a backhaul of the wireless communication system. Hereafter, the term "Femtocell" may be used interchangeably with the term "FBS." Also, an FBS may be referred to as a Femtocell Advanced Base Station (FABS). The deployment of the Femtocell improves both the coverage and capacity of the wireless communication system. Going forward, the advantages of the Femtocell are expected to be increasingly leveraged in wireless communication systems. Since the Femtocell is much smaller than a Macrocell, a plurality of Femtocells may coexist within one Macrocell. The FBS is capable of providing service to relatively a small number of MSs, unlike the MBS, which is capable of providing service to a large number of MSs. The FBS typically operates in a licensed spectrum and may use the same or different frequency as the MBS. Further, MSs serviced by an FBS are typically stationary or moving at low (i.e., pedestrian) speed. Similar to the need for handoff between MBSs, handoff between the Femtocell and the Macrocell, and handoff between Femtocells, is a key function in securing service continuity of an MS.

The FBS may be installed inside or adjacent to an indoor space to which it is intended to provide service, such as a home or Small Office/Home Office (SOHO). Installation of the FBS is significantly easier than installation of the MBS and the FBS may be purchased and installed by a subscriber for use in conjunction with the wireless communication system. Here, the subscriber or service provider may desire to limit access to the FBS and only provide access to authorized MSs. To facilitate this arrangement, a Closed Subscriber Group (CSG) FBS may be employed. The CSG FBS can be further categorized as a CSG-closed and a CSG-open FBS. A CSG-closed FBS may only provide access to authorized MSs, except for emergency services and National Security/Emergency Preparedness (NS/EP) services. A CSG-open FBS (which may be referred to as a hybrid FBS in some systems) may, in addition, allow non-subscribers of the CSG a low priority access or a best-effort access, to guarantee the Quality of Service (QoS) of the subscribers. Alternatively, an Open Subscriber Group (OSG) FBS may be employed that provides access to any MS.

The FBS has different operational requirements than the MBS, the specifics of which may differ depending on the wireless communication system the FBS is implemented in. For example, in a wireless communication system operating according to the Institute of Electrical and Electronics Engineers (IEEE) 802.16m standard, it is required that the air interface support features needed to limit MSs scanning for FBSs. Further it is required that the air interface support MSs in being able to access and HandOver (HO) to CSG FBSs if they are designated as part of the CSG. In addition, it is required that the air interface support preferred access and HO of MSs to their designated FBSs. Also, it is required that the air interface support optimized and seamless session continuity and HO between FBSs and Wireless Fidelity (WiFi) access systems. Further, it is required that the air interface allows for a dense deployment of a large number of Femtocells in a wireless communication system.

Given the above requirements for the Femtocell, which differ from the requirements of the Macrocell, there are a number of issues that arise with the deployment of the Femtocell in a wireless communication system. For example, one issue that arises with the deployment of the Femtocell in a wireless communication system is the need to identify BSs. However, not only is there a need to distinguish FBSs from MBSs, but there is also a need to distinguish open-access FBSs (which any MS is allowed to access) from CSG FBSs (which allows only authorized MSs to access), since some operations (e.g., HO, paging, etc.) may be different for FBSs and MBSs, and for open-access and CSG FBSs. For example, an MS moving at a high speed may not need to HO to any FBS. In another example, open-access FBSs may accept HO requests from any MS while an MS that is not authorized to access a CSG FBS should not send a HO request to that CSG FBS.

It has been proposed to use different groups of preambles to distinguish the types of the cells. The preambles are divided into groups, each group for one type of cell.

It has also been proposed in IEEE 802.16 discussions to use one bit of the Least Significant Bit (LSB), which is a programmable 24 bit segment of the Base Station IDentifier (BS ID), to distinguish FBSs and MBSs, and to use another bit of the LSB to distinguish open-access and CSG FBSs. Here the BS ID is a globally unique ID in an IEEE 802.16 system, with a 24 bit Most significant Bit (MSB) as Operator ID and 24 bit LSB as the ID within the Operator ID.

It has further been proposed to use at least one of different scrambling sequences and different Cyclic Redundancy Check (CRCs) to differentiate FBSs from MBSs, and to differentiate open-access and CSG FBSs.

It has further been proposed that a short FBS ID may be used to conserve overhead of HandOver (HO) messages. However, the structure of such a short FBS ID as not yet been proposed. In addition, how to handle CSG IDs has not yet been proposed.

Despite the various proposals described above, the problem of how to enable an MS to efficiently (with minimum overhead in signaling) identify whether it is authorized to access a CSG FBS, has not been fully addressed. The ability for an MS to identify whether it is authorized to access a CSG FBS is important because it affects which system operations the MS will perform.

The CSG ID is an important ID of a CSG FBS, which can be a CSG-closed or a CSG-open (hybrid) FBS. The CSG ID identifies a closed subscription group. For example, if a business owns several CSG FBSs, there can be a CSG ID assigned to all these CSG FBSs owned by the business. The CSG FBS needs to send the CSG ID to the MS so that the MS may determine whether it is authorized to access the CSG FBS. The reason the CSG ID needs to be sent to the MS is that, even if an MS knows that the FBS is a CSG FBS, the MS still needs to determine whether it has subscribed the CSG, i.e., whether it is authorized to access this CSG FBS in CSG-closed FBS case, or whether it is authorized to have higher priority to access this CSG FBS in CSG-open FBS case. To do this, the MS may have configured and stored therewith a white list of the CSG FBSs which the MS has subscribed. Accordingly, when the MS receives the CSG ID of a CSG FBS, the MS compares the received CSG ID against its white list of CSG IDs of the CSG FBSs the MS has subscribed. If the received CSG ID is in the white list of CSG IDs of the CSG FBSs the MS has subscribed, the MS knows that it has subscribed this CSG FBS. Hence, a CSG ID of the CSG FBS should be sent to the MS. To keep the white list of CSG IDs of CSG FBSs which the MS has subscribed short, multiple CSG FBSs may share a common CSG ID if they have the same set of subscriber MSs.

It has been proposed that the CSG ID, as an additional ID which is independent of the globally unique BS ID, that the FBS should broadcast, is broadcasted over a Broadcast CHannel (BCH), as the payload of the BCH. This introduces overhead on BCH.

It has been proposed to use the CSG IDs as different scrambling sequences to scramble a CRC of a BCH, so that the MS may differentiate CSG FBSs and determine whether it is authorized to access a given CSG FBS.

Another possible way for the MS to determine whether it is authorized to access a given CSG FBS is for the MS to have a white list of BS IDs of CSG FBSs the MS is authorized to access. Accordingly, when the MS receives the BS ID of a CSG FBS, the MS compares the received BS ID against its white list of BS IDs of the CSG FBSs the MS has subscribed. If the received CSG FBS ID is in the white list of BS IDs of the CSG FBSs the MS is authorized to access, the MS knows that it is authorized to access this CSG FBS. Note that a globally unique BS ID may be needed for an MS to access an FBS securely and for some other purposes. If the MS stores globally unique BS IDs, the white list may end up being very long. For example, consider the situation where an FBS is located at each Starbucks™ location, of which there may be hundreds or thousands of locations throughout the world. In this case, the white list will end up being very long.

Accordingly, using the CSG IDs over the BS IDs to determine if an MS is authorized to access a CSG FBS, could shorten the white list at the MS. In addition, use of the CSG ID to determine if an MS is authorized to access a CSG FBS may provide for easier management. Consider the example given above of an FBS located at each Starbucks™ location, when a CSG ID is not used to determine if an MS is authorized to access a CSG FBS. Here, when Starbucks™ installs a new CSG FBS, Starbucks™ has to request that the operator update the white list of all of its membership subscribers to add this new CSG FBS. However, if a CSG ID is used to determine if an MS is authorized to access a CSG FBS, such update is not needed.

Nevertheless, if the CSG ID is used for the MS to determine if the MS is authorized to access a CSG FBS, the CSG ID may be of a length similar to the BS ID. This may occur because, in the worst case scenario, one CSG ID will be needed for each FBS, such as in a home use case. In addition, since the CSG ID may not offer a globally unique BS ID for a CSG FBS for e.g., membership use cases, the globally unique BS ID is still needed for uniquely identifying FBSs in order to have secure access to an FBS and for other purposes. Accordingly, the worst case is that both the CSG ID and the globally unique BS ID, which can be of similar length, need to be broadcast.

Herein, there is need to efficiently provide both the CSG ID of the CSG FBS and the globally unique BS ID to the MS. However, such improvement should take diverse Femtocell use cases into consideration. Examples of such use cases include a home use case, an enterprise use case, a membership use case, an operation use case, etc. An example of the home use case is where a home owner purchases an FBS and authorizes access to only the MSs of family members and friends. An example of the enterprise use case is where a company purchases tens or hundreds of FBSs to enhance connectivity and authorizes access to only the MSs of employees of the company. An example of the membership use case is where a user may purchase a membership to access FBSs at Starbucks™, which means that the user should be authorized to access all FBSs owned by Starbucks™. An example of the operator use case is where the operator uses FBSs to fix service coverage holes. In this case, all subscribers of this operator should be authorized to access those FBSs.

Given these diverse use cases, if the CSG ID is of a fixed length, then the length of the CSG ID would be similar to the length of BS ID because in the worst case scenario, such as the home use case, the globally unique BS ID is still needed for e.g., the membership use case, to uniquely identify the CSG FBS.

Therefore, a need exists for a technique to efficiently provide the MS with both the CSG ID of the CSG FBS and the globally unique BS ID over the air, for diverse Femtocell use cases.

SUMMARY OF THE INVENTION

An aspect of the present invention is to address at least the above-mentioned problems and/or disadvantages and to provide at least the advantages described below. Accordingly, an aspect of the present invention is to provide techniques for identifying base stations in a communication system.

In accordance with an aspect of the present invention, a method for use in a wireless communication network comprising a plurality of Base Stations (BSs) capable of communicating with a plurality of Mobile Stations (MSs), wherein at least some of the BSs are Femtocell BSs (FBSs) and at least some of the BSs are Macrocell BSs (MBSs), for identifying the BSs at an MS, is provided. The method includes receiving at least one of a globally unique BS ID and an Operator ID from an FBS via a Broadcast CHannel (BCH), deriving a Closed Subscriber Group IDentifier (CSG ID) from the received at least one of the globally unique BS ID and the Operator ID, and determining, based on the derived CSG ID, if the FBS is a CSG FBS to which the MS is subscribed.

In accordance with another aspect of the present invention, a MS, for use in a wireless communication network comprising a plurality of BSs capable of communicating with the MS and other MSs, wherein at least some of the BSs are FBSs and at least some of the BSs are MBSs, is provided. The MS includes a receiver for receiving signals from at least one of the BSs, a transmitter for transmitting signals to at least one of the BSs, and a controller for controlling to receiver at least one of a globally unique BS ID and an Operator ID from an FBS via a BCH, for controlling to derive a CSG ID from the received at least one of the globally unique BS ID and the Operator ID, and for controlling to determine, based on the derived CSG ID, if the FBS is a CSG FBS to which the MS is subscribed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
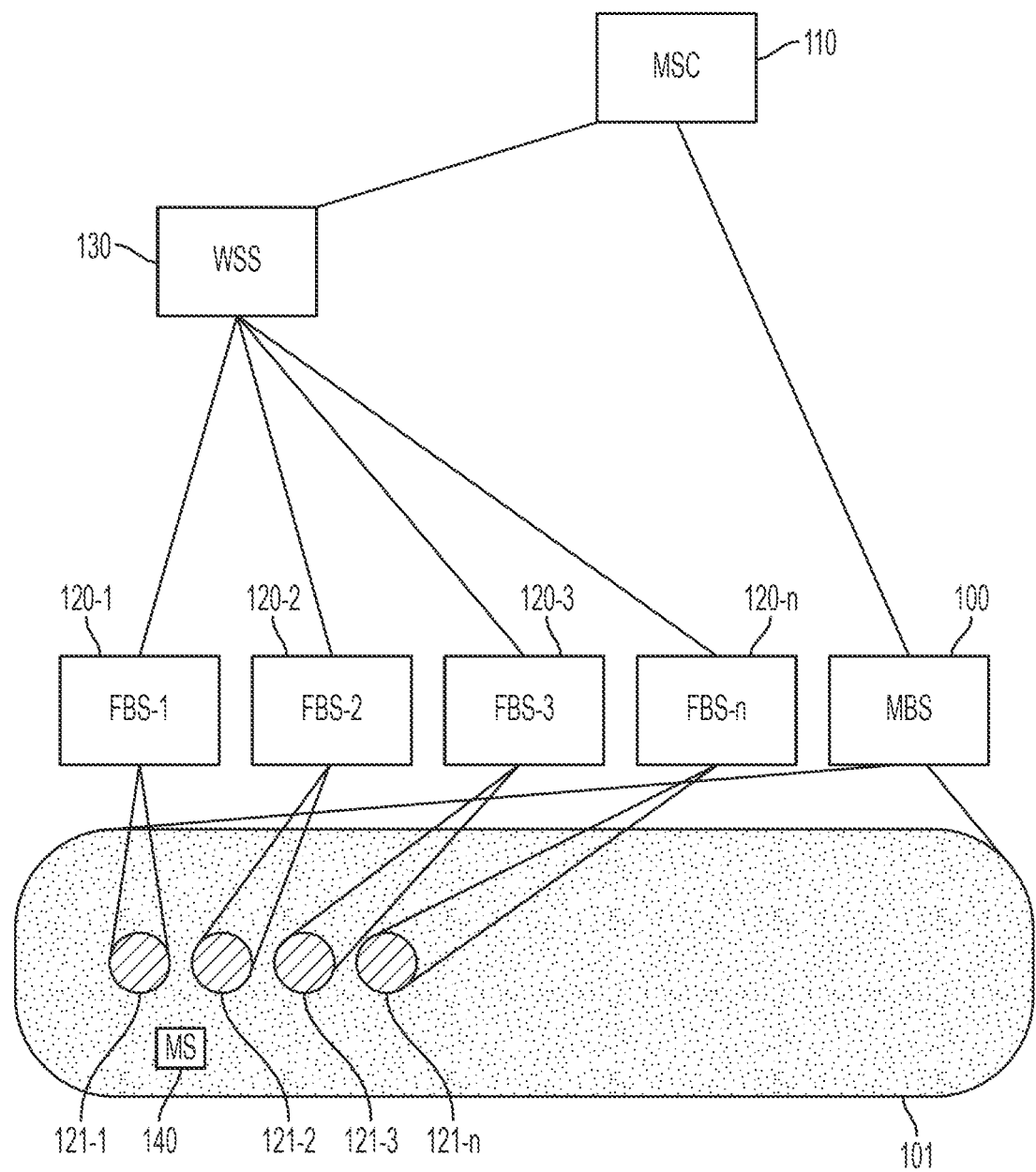
FIG. 1 illustrates a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to techniques for identifying Base Stations (BSs) in a communication system. It should be understood that the following description might refer to terms utilized in various standards merely for simplicity of explanation. For example, the following description may refer to terms utilized in the Institute of Electrical and Electronics Engineers (IEEE) 802.16m standard or the $3^{rd}$ Generation Partnership Project (3GPP) Long Term Evolution (LTE) standard. However, this description should not be interpreted as being limited to the IEEE 802.16m or 3GPP LTE standards. Independent of the mechanism used for handoff, it is preferable to perform IM and it is advantageous for that ability to conform to a standardized mechanism.

Herein, the term "Femtocell" may be used interchangeably with the term "Femtocell Base Station (FBS)" and the term "Macrocell" may be used interchangeably with the term "Macrocell Base Station (MBS)." A Mobile Station (MS) may also be referred to as an Advanced Mobile Station (AMS), an MBS may also be referred to as a Macrocell Advanced Base Station (MABS), and a FBS may also be referred to as a Femtocell Advanced Base Station (MABS).

In this disclosure, a limited number and types of BSs, a limited number of MSs, or limited use cases may be described as an example. However, the exemplary embodiments of the present invention disclosed herein are also applicable to an arbitrary number and types of BSs, an arbitrary number of MSs, and other related use cases. The exemplary embodiments and/or the extensions of the exemplary embodiments may be combined within themselves or combined with other known BS identification.

Exemplary embodiments of the present invention will be described in the context of a wireless communication system described below with reference to FIG. 1.

FIG. 1 illustrates a wireless communication system according to an exemplary embodiment of the present invention.

Regarding FIG. 1, the wireless communication system includes an MBS 100 servicing a Macrocell 101, a Mobile Switching Center (MSC) 110, a plurality of FBSs 120-1 . . . 120-n servicing respective Femtocells 121-1 . . . 121-n located within Macrocell 101, a Wireless Soft Switch (WSS) 130, and a MS 140.

This configuration of the wireless communication system is merely an example. Exemplary embodiments of the present invention are equally applicable to other configurations of the wireless communication system. For example, the wireless communication system/network may include any number of additional MBSs, MSCs, FBSs, WSSs, and MSs, or any number of additional BSs of other types or other tiers, such as Pico, Micro, Relay cells, or any other network entities such as a Self-Organized Network (SON) server that can manage and coordinate cells and other entities. Further, the wireless communication system may include other network elements, which are omitted herein for conciseness. In addition, the wireless communication system may be a wireless communication system operating according to the IEEE 802.16m standards, 3GPP LTE standards, or any other wireless communication standards.

Any number of Femtocells 121-1 . . . 121-n may at least partially overlap with any number of other Femtocells 121-1 . . . 121-n. Further, at least a portion of any number of Femtocells 121-1 . . . 121-n may be disposed outside Macrocell 101 and/or overlap with another Macrocell (not shown). While FBSs 120-1 . . . 120-n are assumed to be of the same type, any number of the FBS 120-1 . . . 120-n may be of different types. In addition any number of the FBSs 120-1 . . . 120-n may be a Closed Subscriber Group (CSG) FBS or an Open Subscriber Group (OSG) FBS. Any CSG FBS may be a CSG-open FBS or CSG-closed FBS.

The MSC 110 communicates with MBS 100 and WSS 130. Alternatively, or in addition, MBS 100 and WSS 130 may directly communicate with each other. The communications between MBS 100 and WSS 130 may occur via a backhaul through a backbone network of the wireless communication system. The FBSs 120-1 . . . 120-n may communicate with WSS 130 through a commercial broadband network. FBSs 120-1 . . . 120-n may communicate with each other through WSS 130. Alternatively, or in addition, FBSs 120-1 . . . 120-n may directly communicate with each other through at least one of a direct wireless connection or a commercial broadband connection. FBSs 120-1 . . . 120-n may directly communicate with at least one of MSC 110 and MBS 100. FBSs 120-1 . . . 120-n and MBS 100 may also communicate with a SON server.

MS 140 may be mobile or stationary and may be located inside or outside any of Macrocell 101 and Femtocells 121-1 . . . 121-n. Handoff between any of the MBS 100 and FBSs 120-1 . . . 120-n is employed for service continuity of the MS 140.

Techniques for identifying BSs in a communication system according to exemplary embodiments of the present invention, will be described below in the context of the exemplary wireless communication system described above with reference to FIG. 1. In one exemplary embodiment of the present invention, an FBS is identified by its Subscriber Group IDentifier (SG ID) and a further ID of the BS associated with the SG ID. The lengths of both the SG ID and the further ID are flexible for diverse Femtocell use cases, i.e., the length of SG IDs may be different for different Femtocell use cases, as can the length of the further ID. The SG ID is sent, e.g., broadcasted in a Broadcast CHannel (BCH) by the FBS in the air and is used for a MS to determine whether it is subscribed to the FBS. The further ID is sent, e.g., broadcast in the BCH by the FBS in the air and is used to further globally identify the FBS for secure access and other purposes. The SG ID may be sent more frequently, while the further ID may be sent less frequently.

The BCH is a control channel on which a BS broadcasts important system information. For example, in an Orthogonal Frequency-Division Multiplexing (OFDM) based Multiple-Input-Multiple-Output (MIMO) wireless communication system, the BCH often carries information about system bandwidth, antenna configuration, configuration of other control channels, and other critical system configurations. An MS should correctly detect the BCH of a BS in order to establish further communication with that BS. Note that the BCH may be referred to as different channels in different systems.

Herein, the term SG ID refers to both an open SG ID (i.e., open to all MSs) and a closed SG ID (open only to authorized MSs). The SG ID is used to identify the BSs belonging to the same SG, or in other words, the SG ID is a common ID of the BSs belonging to the same SG. The SG ID can be further concatenated with the Operator IDentifier (Operator ID), which is the ID for the operators of the communication systems, to become a globally unique SG ID. The Operator ID, usually serves as the Most Significant Bits (MSB) of a globally unique Base Station IDentifier (BS ID). The globally unique BS ID can then be a concatenation of the Operator ID, the SG ID, and the further identifier associated with the SG ID, where the concatenation of the Operator ID and the SG ID gives a globally unique SG ID. The SG ID can otherwise be referred to as a CSG ID, with the open SG ID being a reserved value and all the open FBS sharing the reserved value.

Table 1 shows an example of four types of use cases of Femtocells and their SG IDs and further IDs. Table 1 omits the Operator ID. The Operator ID can be, for example, a length of 24-bits, as in IEEE 802.16 system. The Operator ID as the MSB concatenating the SG ID as the Least Significant Bits (LSB), can be the globally unique SG ID. The globally unique SG ID concatenating the further identifier with the SG ID can be the globally unique BS ID. There is no need for a separate set of BS IDs which are independent of the BS ID that is the concatenation of Operator ID, SG ID and the further identifier within SG ID. In this example, we use 24 bits as the maximum length of the further ID, wherein one bit is used to distinguish open and CSG Femtocells (an additional bit may be used within the CSG FBS, to differentiate a CSG-open and a CSG-closed FBS), and two bits are used to indicate different types of use cases. If the partitioning of the 24 bit space is used for different types of BSs, then these additional bits (one bit indicating open/close, two bits indicating Femtocell use cases) are not needed. Herein, A, B, C, and D are parameters. For the worst case provision for a fixed length SG ID and a fixed length further ID, there are 48 bits needed all together, 24 bits for each. In contrast, with a flexible length SG ID and a flexible length further ID, only 24 bits may be needed due to partitioning of the 24-bit space, or 27 bits may be needed by adding some identifier to indicate types of use cases.

TABLE 1

| BS description | SG ID (representing set of BSs open to same subscribers, within one Operator ID) | Further ID of BSs associated with one SG ID, within one Operator ID |
|---|---|---|
| | Written in the list of allowable Femtocells, at MS. Femtocell sends in BCH, more frequently. | Femtocell sends in BCH, less frequently |
| BSs other than femto | NULL | 24 bits (same as in IEEE 802.16e communication system) |
| Open femto (within the operator) | 0 (initiate with 0) | 24 bits, in SuperFrame Header (SFH), good for Network Entry (NE), isolated (not overlaid) femto |
| Home femto, Open only to authorized MSs, such as family, friends | 1(initiate with 1) concatenating 00 (type indicator) concatenating (24 minus A) bits [similar change needed for other entries in this column] | A bits (in case one home owner buys up to $2^A$ femtos) |
| Small business femto, Open only to authorized MSs, such as employees, partners | 1(initiate with 1) + 01 (type indicator) + 24-B bits | B bits (in case one enterprise buys up to $2^B$ femtos) |
| Medium business femto, Open only to authorized MSs, such as employees, partners, memberships | 1(initiate with 1) + 10 (type indicator) + 24-C bits | C bits (in case one enterprise buys up to $2^C$ femtos) |
| Large business femto, Open only to authorized MSs, such as employees, partners, memberships | 1(initiate with 1) + 11 (type indicator) + 24-D bits | D bits (in case one enterprise buys up to $2^D$ femtos) |

One of the benefits of this exemplary embodiment is that by implementing a flexible length SG ID and further ID, the average total length of the SG ID and further ID is significantly reduced compared to the worst case provision where a fixed length SG ID and further ID are implemented.

As an enhancement of the above exemplary embodiment of the present invention, the further ID of the FBS may be a fixed length and may correspond to what an MBS uses for a BS ID.

For example, if a globally unique BS ID for an MBS is Operator ID concatenating 24 bit BS ID, the further ID of the FBS may be a 24 bit Least Significant Bit (LSB) of a globally unique BS ID.

As another enhancement of the above exemplary embodiment of the present invention, the flexible SG ID may be combined with a technique of scrambling the CRC of the BCH. For example, the SG ID for a home use FBS may be just the 24 bit BS ID and such 24 bit BS ID may be used as the CRC mask of the BCH. Here, there is no need to transfer any further BS ID.

As another enhancement of the above exemplary embodiment of the present invention, the flexible SG ID may be combined with a technique for a short BS ID. For example, the short BS ID may be partitioned based on the Femtocell use cases, and for the home FBS, the SG ID may be just the 24 bit BS ID. In this case, there is no need to transfer any further BS ID. For other use cases, such as membership use case, an SG ID shorter than 24 bits may be used.

In another exemplary embodiment of the present invention, a long SG ID may be mapped to shortened IDs, which are sent in massages over the air, to conserve overhead. In other words, an SG ID may not need to be globally unique.

The short SG ID (a) may be generated from an original long SG ID (b) using any of a number of techniques. For example, the short SG ID (a) may be generated from the original long SG ID (b) based on a hash function. In another example, the short SG ID (a) may be generated from the original long SG ID (b) based on the equation a=b mod n, where n is a given constant. In yet another example, the short SG ID (a) may be generated from the original long SG ID (b) based on mapping of a=LSB_n(b), the n-bit LSB of b. For the MS to translate the short SG ID into the original long SG ID, multiple SG IDs may result, thereby causing a collision. On the other hand, of those multiple SG IDs, there may only be a few SG IDs that the MS is subscribed to and that the MS can detect. Thus, if the collision occurs, the MS may detect the collision until the further ID is decoded. However, there is a low probability of such collision.

Hereafter, exemplary embodiments of the present invention will be described with respect to a CSG FBS and its corresponding CSG ID as an example. However, the present invention is equally applicable to other FBSs or BSs and their corresponding SG ID. The CSG ID may be used for CSG-closed or CSG-open (hybrid) FBSs, or a reserved CSG ID may be used for open FBSs. The CSG ID may be used to identify the BSs belonging to the same CSG, or in other words, the CSG ID may be a common ID of the BSs belonging to the same CSG.

Herein, it is assumed that a globally unique BS ID consists of an Operator ID and an LSB of the BS ID (hereafter denoted as BSID_LSB). In another exemplary embodiment of the present invention, the CSG ID may be part of the full BS ID (or the globally unique BS ID), may be derived from the full BS ID, or the CSG ID can be constructed based on the globally unique BS ID. The CSG ID of an FBS may be a concatenation of the Operator ID and a CSG_LSB, which may be part of the BSID_LSB, e.g., several bits of the Most Significant Bit (MSB) of the BSID_LSB; or may be a concatenation of a part of the BSID_LSB and some additional bits; and so on.

An operator may have multiple Operator IDs, for the same value of the CSGID_LSB. The CSG_LSB may not need to be a concatenation of several separate portions of BSID_LSB. If the CSGID_LSB is in fixed/predefined location (e.g., first 4 MSB) in the BSID_LSB, then the fixed/predefined location should also be known by the MS. However, if the CSGID_LSB is in a dynamic location in the BSID_LSB, then the dynamic location should also be notified/signaled to the MS.

Figure 2:
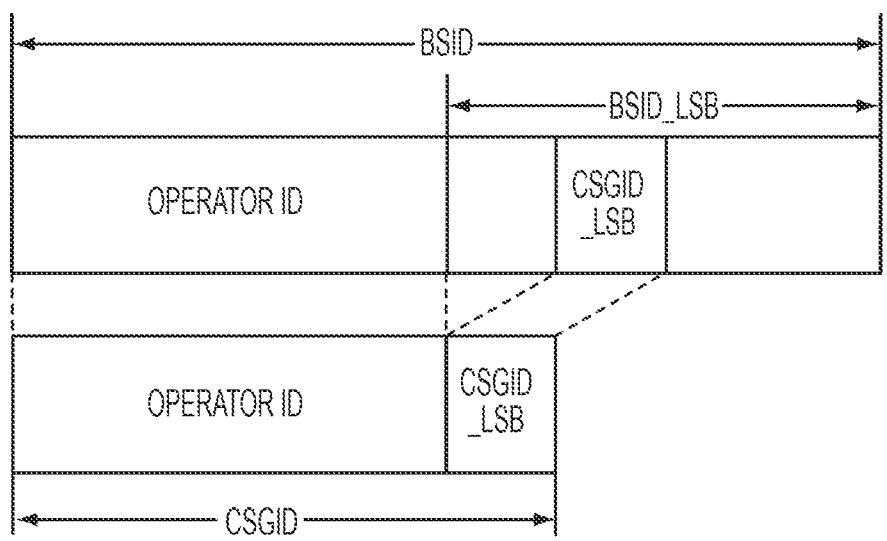
FIG. 2 illustrates a CSG ID being a concatenation of an Operator ID and part of a BSID_LSB according to an exemplary embodiment of the present invention.

FIG. 2 illustrates a CSG ID being a concatenation of an Operator ID and part of a BSID_LSB according to an exemplary embodiment of the present invention.

Referring to FIG. 2, a BS ID includes an Operator ID and a BSID_LSB. The BSID_LSB includes a CSGID_LSB. As can be seen herein, the CSG ID is a concatenation of the Operator ID and the CSGID_LSB.

As an extension of the exemplary embodiment described above, the CSG ID may be a concatenation of an Operator ID and a CSG_LSB, which is part of the BSID_LSB, and an additional LSB which is not from the BSID_LSB. The advantage of this is that the CSG ID may be longer, which allows the CSG ID to cater to more CSGs.

Figure 3:
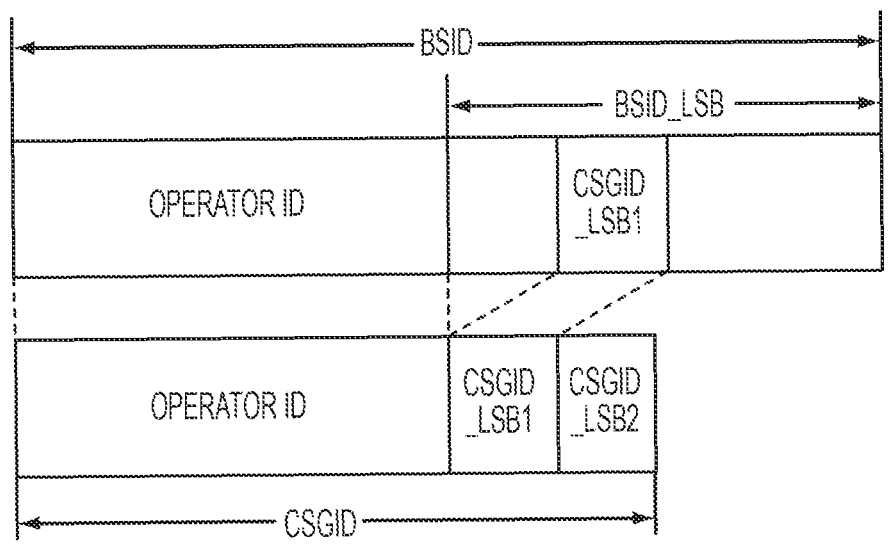
FIG. 3 illustrates a CSG ID being a concatenation of an Operator ID, part of a BSID_LSB, and an additional LSB according to an exemplary embodiment of the present invention.

FIG. 3 illustrates a CSG ID being a concatenation of an Operator ID, part of a BSID_LSB, and an additional LSB according to an exemplary embodiment of the present invention.

Referring to FIG. 3, a BS ID includes an Operator ID and a BSID_LSB. The BSID_LSB includes a CSGID_LSB1. As can be seen herein, the CSG ID is a concatenation of the Operator ID, the CSGID_LSB1 and a CSGID_LSB2.

As an extension of the exemplary embodiment described above, the CSG ID may be a concatenation of an Operator ID and the CSG_LSB, which is part of the BSID_LSB, and an additional MSB, which is not from the BSID_LSB. The advantage of this is that the CSG ID may be longer, which allows the CSG ID to cater to more CSGs.

Figure 4:
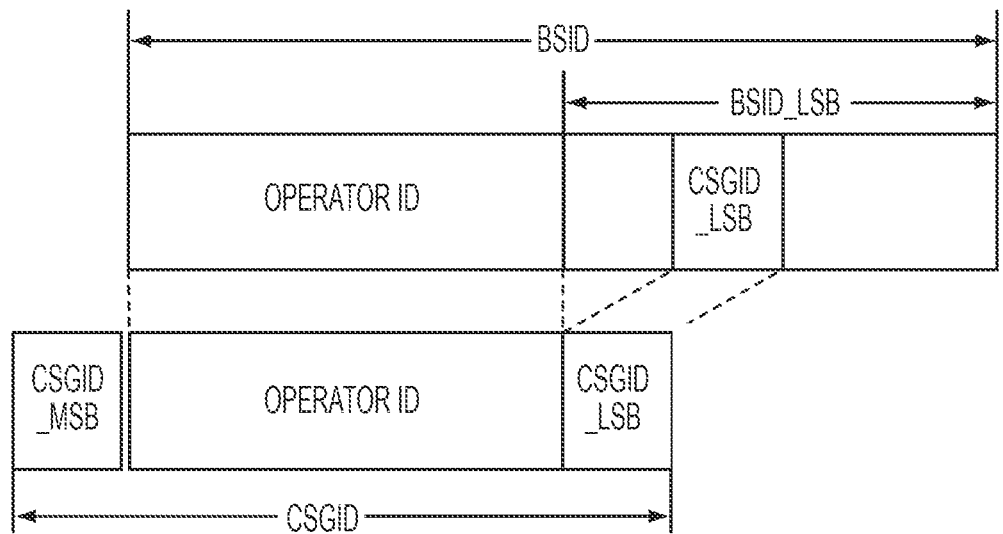
FIG. 4 illustrates a CSG ID being a concatenation of an Operator ID, part of a BSID_LSB, and an additional MSB according to an exemplary embodiment of the present invention.

FIG. 4 illustrates a CSG ID being a concatenation of an Operator ID, part of a BSID_LSB, and an additional MSB according to an exemplary embodiment of the present invention.

Referring to FIG. 4, a BS ID includes an Operator ID and a BSID_LSB. The BSID_LSB includes a CSGID_LSB. As can be seen herein, the CSG ID is a concatenation of the Operator ID, the CSGID_LSB and a CSGID_MSB.

Herein, the additional portion concatenated in the CSG ID may not be limited to an MSB or an LSB as illustrated in FIGS. 2 and 3 and as described above. Instead, the additional portion may come from anywhere in the CSG ID.

As an extension of the exemplary embodiment described above, there may be multiple types of CSG ID, e.g., there may be multiple different lengths of the CSG ID. The CSG ID may have a type indicator that indicates the type of CSG ID. The length of CSGID_LSB, which is a portion of the BSID_LSB, may be different lengths for different types.

Different types of CSG ID may be used for different use cases, such as different sizes of the SG. If there are many FBSs in one SG, the CSGID_LSB may be smaller in size. The type indication bits may be disposed in, or not in, the BSID_LSB.

Figure 5:
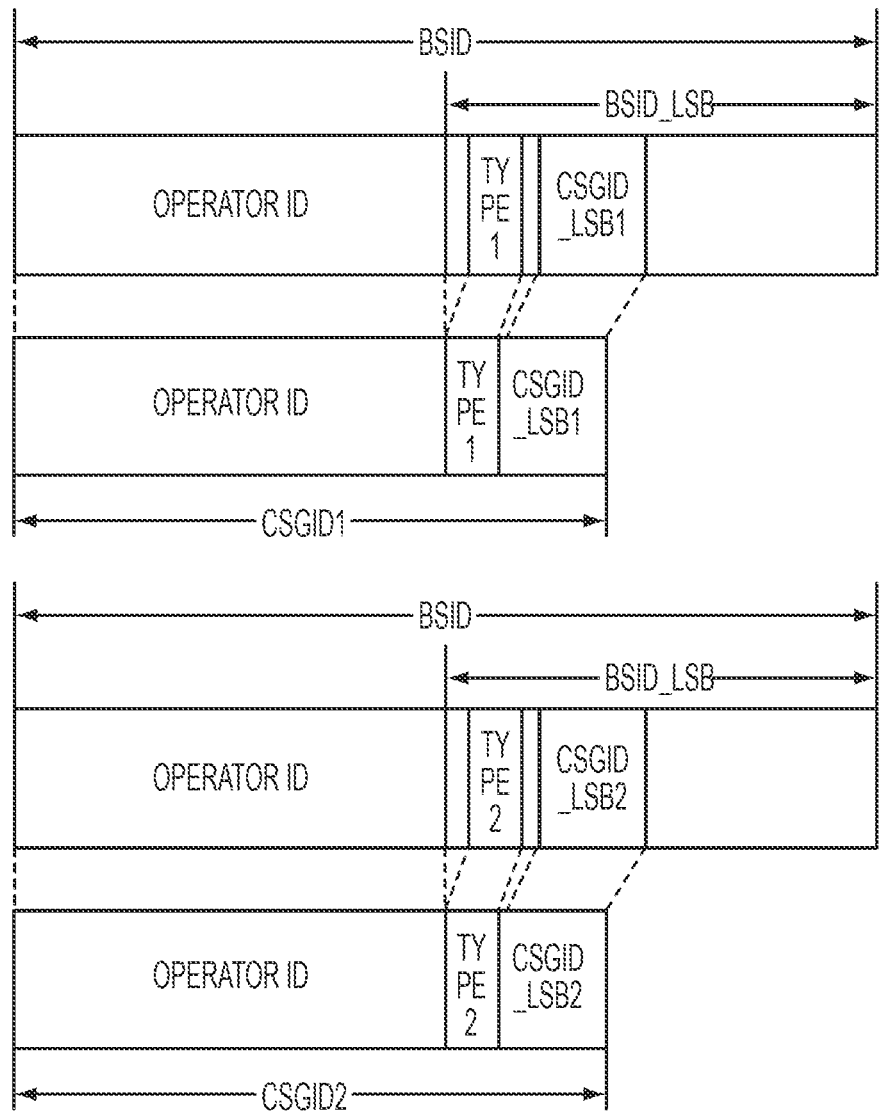
FIG. 5 illustrates two CSG IDs having different lengths according to an exemplary embodiment of the present invention.

FIG. 5 illustrates two CSG IDs having different lengths according to an exemplary embodiment of the present invention.

Referring to FIG. 5, CSG ID 1 and CSG ID 2 are shown that are derived from the same BS ID. The BS ID includes an Operator ID and a BSID_LSB. The BSID_LSB includes a type indicator that indicates the type of CSG ID and a CSGID_LSB. More specifically, in the case of CSG ID 1, the BSID_LSB includes a Type 1 indicator and CSGID_LSB1. In the case of CSG ID 2, the BSID_LSB includes a Type 2 indicator and CSGID_LSB2. Herein, CSGID_LSB2 is longer than CSGID_LSB1.

In another exemplary embodiment of the present invention, the MS stores a list of CSG IDs of the CSG FBSs to which the MS is subscribed. In the list, for all CSG IDs containing the same Operator ID, only one copy of the Operator ID may be stored to reduce the size of the list.

Figure 6:
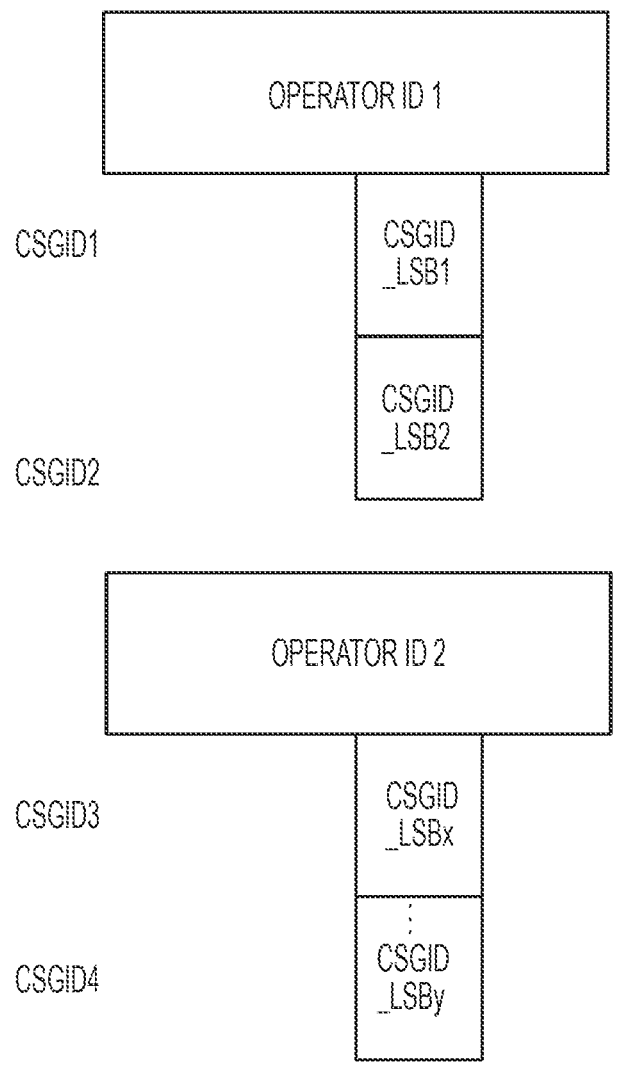
FIG. 6 illustrates a list of CSG IDs according to an exemplary embodiment of the present invention.

FIG. 6 illustrates a list of CSG IDs according to an exemplary embodiment of the present invention.

Referring to FIG. 6, CSG ID 1, CSG ID 2, CSG ID 3, are CSG ID 4 are included in the list. Herein CSG ID 1 and CSG ID 2 contain the same Operator ID, namely Operator ID 1. Accordingly, Operator ID 1 is not repeatedly stored for both CSG ID 1 and CSG ID 2. Instead, CSGID_LSB1 and CSGID_LSB2 are stored for CSG ID 1 and CSG ID 2, respectively, and are both associated with Operator ID 1. Similarly, CSG ID 3 and CSG ID 4 contain the same Operator ID, namely Operator ID 2. Accordingly, Operator ID 2 is not repeatedly stored for both CSG ID 3 and CSG ID 4. Instead, CSGID_LSB3 and CSGID_LSB4 are stored for CSG ID 3 and CSG ID 4, respectively, and are both associated with Operator ID 2.

If CSGID_LSB is in a fixed/predefined location (e.g., first 4 MSB) in BSID_LSB, then the fixed/predefined location should also be known by the MS, and the MS may utilize this knowledge to optimize the memory for the list of CSG IDs of the CSG FBSs to which the MS is subscribed.

If CSGID_LSB is in a dynamic location in the BSID_LSB, then the dynamic location should also be notified/signaled to the MS, and the MS may utilize this knowledge to optimize the memory for the list of CSG IDs of the CSG FBSs to which the MS is subscribed.

In an exemplary embodiment of the present invention, the MS's whitelist contains the IDs of the CSG BSs to which the MS is subscribed, i.e., to which the MS has the right to access if the CSG BS is a CSG-closed type, or has the right to have a higher priority to access if the CSG BS is a hybrid CSG, (or CSG-open type), The MS's local whitelist may contain the allowable BS ID or the CSG ID (the common ID of the CSG) (wherein 'allowable' here denotes the CSG BSs that the MS is subscribed to) and the relevant information to help the derivation of the allowable BS ID from the common identifier, or the derivation of the common ID (CSG ID) from the received BS ID. The relevant information may reflect or reveal the mapping rule or the construction rule of how the CSG ID is constructed, or how the CSG ID is derived from the BS ID, etc. The mapping rule can be per Operator ID. The relevant information can be obtained by the MS, via e.g., pre-provisioning, broadcasting, unicasting, multicasting, etc. The network entity, such as the BS, can send the relevant information and its updates to the MS, via e.g., pre-provisioning, broadcasting, multicasting, unicasting, etc.

In an exemplary embodiment of the present invention, the related operations of the MS may be as follows. The MS receives a BS ID, and additional bits for the CSG ID, such as a CSGID_MSB and a CSGID_LSB2. The MS constructs the CSG ID, compares the constructed CSG ID with the CSG ID stored in the list of CSG IDs of the CSG FBSs to which the MS is subscribed. The comparing may be performed piece by piece of the CSG ID, e.g., by comparing the CSGID_MSB, the CSGID_LSB2, and the Operator ID, separately, i.e., piece by piece.

The decision of whether a CSG ID is in the whitelist can be made before all the pieces, or the entire CSG ID, are compared, e.g., the MS may check the Operator ID first. If the Operator ID is not in the set of Operator IDs stored in the whitelist, the MS may immediately determine that the received CSG ID is not in the whitelist, without having to finish checking the entire CSG ID. If the CSG ID is not in the whitelist, then the MS may determine that the FBS is not the FBS to which the MS is subscribed, or determine that the MS is not a subscriber or the member of the FBS, which means that the MS is not subscribed to the FBS if the FBS is CSG-closed, while if the FBS is hybrid CSG or CSG-open, the MS can still have a lower priority to access since it is a non-subscriber, i.e. a non-member. As another example, if the CSG ID happens to be the BS ID, such as in a home use case, then the LSB of the BS ID or the MSB of the BS ID can be used by the MS to determine whether the CSG ID or the BS ID is in the whitelist. If the BS ID is sent by the BS in multiple pieces, e.g., the LSB portion and MSB portion, and if the MS receives the LSB portion first, then the received LSB can be used to determine whether the CSG ID or the BS ID is in the whitelist. Otherwise, the determination may stop here and the MS can conclude it is not in the whitelist. However, if the received LSB is in the whitelist, the MS may go further to decode the received MSB portion and compare. If the received MSB is also in the whitelist, then the CSG ID or the BS ID is in the whitelist, otherwise it is not. A similar process can be performed if the MS receives the MSB portion of the CSG ID or the BS ID.

In one exemplary embodiment of present invention, for different Operator IDs, different rules of how to construct the CSG ID of the CSG FBS may be applied. A table or a mapping rule indicating which Operator ID uses which rule of CSG ID construction may be used, and may be known by the MS, such as in a white list at the MS. BSs may also know such table or mapping rule, e.g., via the backhaul, or higher layer provisioning. The rule of CSG ID construction, may include the specification of how the CSG ID is constructed, e.g., which type bits indicating which length of the CSG ID, which bits of the BS ID make up the CSG ID, etc.

The information of which bits are designated as the CSG ID may be established per Operator ID. This information should be signaled to the MS, in a broadcast manner, unicast manner or may be pre-provisioned. Multiple Operator IDs may have the same CSG construction information. As an example, this information may be unicasted during initial network entry in the response to the registration (e.g., in an IEEE 802.16m AAI_REG_RSP message). The information can be stored in the MS, e.g., in the whitelist at the MS.

Default values of which bits are designated as the CSG ID may be specified and used by the MS if the BS has not signaled this information.

For example, there may be a CSG_Type value, indicating different use cases of CSG for one operator. The CSG_Type value may be mapped to the length (denoted as m) of the CSG ID, and CSG ID may be MSB_m(full BS ID), i.e., the MSB m-bits of the full BS ID. Herein, an example shown below in Table 2.

TABLE 2

| Operator ID 1 | CSG_Type = $26^{th}$ bit of the full BS ID counted from the MSB | If CSG_Type=0, then CSGID=MSB_44(BSID), small business case CSG_Type=1 reserved. |
|---|---|---|
| Operator ID 2 | CSG_Type = $26\text{-}27^{th}$ bit of the full BS ID counted from the MSB | If CSG_Type=01, then CSGID=MSB_40(BSID), medium business case If CSG_Type=10, then CSGID=MSB_44(BSID), small business case CSG_Type=00,01, reserved. |

Herein, a default value may be, for example, if the CSG_Type is 26-27th bit of the full BS ID counted from the MSB, then:

If CSG_Type=00, then CSGID=MSB_36 (BSID), large business case

If CSG_Type=01, then CSGID=MSB_40(BSID), medium business case

If CSG_Type=10, then CSGID=MSB_44(BSID), small business case

If CSG_Type=11, then CSGID=MSB_48(BSID), i.e., CSGID=full BS ID, home case

The advantage of the exemplary embodiment described above is that more flexibility for different operators is achieved. Each operator may customize or construct the CSG ID according to its supported CSG use cases. For example, some operator may only support small business FBSs. In this case, a longer CSG ID may be employed. In contrast, some operator may support medium and small business FBSs. In this case. There may be two types of CSG ID, one longer for small business and one shorter for medium business. In addition, some operator may only have the FBS home use case. In this case, a CSG ID may not be needed and the BS ID may be used instead, or in other words, the CSG ID is equivalent to the BS ID.

In one exemplary embodiment of present invention, a full BS ID may be used (e.g., in a IEEE 802.16 communication system, a full BS ID is a 24 bit Operator ID plus a 24 bit BSID_LSB), with an additional indication (e.g., a mask, where a '1' in the mask denotes one or more positions of the sequence of the full BS ID that do not make up the CSGID) to tell which bits of the full BS ID make up the CSG ID, or with additional indication (e.g., a mask, where a '1' in the mask denotes one or more positions of the sequence of the full BS ID that makes up the CSGID) to tell that the bits excluding the masked bits of the full BS ID make up the CSG ID. The additional indication (e.g., mask) may only be effective for part of the full BS ID.

For example, if a full BS ID is 00111 . . . 11 (48 bits) and a mask is (00.0011) 48 bits, where the '1' in the mask denotes that a position of the sequence of the full BS ID is not in the CSG ID, then the CSG ID is the MSB_46 bits of the full BS ID. In another example, a mask may be (00 . . . 0011) 24 bits, which may be the mask only used for the BSID_LSB 24 bits.

In an exemplary embodiment of present invention, consecutive BS IDs may be reserved for BSs in the same CSG, and the first (alternatively it may be the last) BS ID of these reserved consecutive BS ID, may be used as the CSG ID. An additional indication may be used together to tell how many BS IDs are in the same CSG.

For example, if (001111 . . . 1100) (001111 . . . 1101) (001111 . . . 1110), (001111 . . . 1111) are each 48 bits, and are consecutive BS IDs reserved for a CSG. Then the CSG ID may be (001111 . . . 1100). An additional indication, 100, which denotes four, may be used to indicate the number of BS IDs in the same CSG.

As an extension of the exemplary embodiment described above, consecutive BS IDs may be reserved for BSs in the same CSG, and the first (alternatively it may be the last) BS ID of these reserved consecutive BS ID, may be used as the CSG ID. The first BS ID ends with consecutive zeros, and the number (denoted as n) of such ending consecutive zeros may indicate the number ($2^n$) of the BS IDs in the same CSG ID. The number 'n' may be indicated by a mask, or explicitly. Herein, an example is shown below in Table 3.

TABLE 3

| Operator ID 1 | CSG ID = the first BS ID of reserved consecutive BS ID and the first BS ID ends with consecutive 'n' zeros, which indicates $2^n$ BS IDs in the same CSG ID. | 'n' may be any number less than 23. |
|---|---|---|
| Operator ID 2 | CSG ID = the first BS ID of reserved consecutive BS ID and the first BS ID ends with consecutive n zeros, which indicates $2^n$ BS IDs in the same CSG ID. | 'n' may be any number less than 22. |

Herein, the default rule may be the same rule as well. Here, CSG ID is the first BS ID of reserved consecutive BS IDs and the first BS ID ends with consecutive n zeros, which indicates $2^n$ BS IDs in the same CSG ID. The advantage of such a rule is that it is very flexible since there is no type limitation and 'n' may be an arbitrary number.

In an exemplary embodiment of present invention, in a white list at the MS, the BS ID associated with the CSG ID (i.e., the BS ID which contains a CSG ID) may be stored in a way that it will be indexed by the CSG ID, if such BS ID is stored. The BS ID which is not associated with any CSG ID, may be stored in a category specifically for the BS ID not associated with CSG ID. Upon receiving a 48 bit BS ID, the MS may search for a category of CSG ID and the category of BS ID not associated with CSG ID separately.

For example, the MS may first check the category of the BS ID not associated with the CSG ID to see whether it matches any of the BS IDs. If there is not a match, then the MS may check the CSG ID. Here, for example, the MS may first check the Operator ID or the BSID_LSB first.

When MS is checking whether the received BS ID contains a CSG ID, the MS will first look at the Operator ID of the received BS ID, find the rule, determine or derive what the CSG ID should be based on the rule, and compare the figured-out or the derived CSG ID with the CSG ID in the white list. If there is a match, the MS determines that it is a subscriber or member of the CSG. In contrast, if there is not a match, the MS determines that it is not a subscriber or member of the CSG FBS.

The above procedure may be performed in another order, e.g., the MS may check the CSG ID first, and then the BS ID not associated with any CSG ID.

In one exemplary implementation, in a IEEE 802.16m communication system, the common identifier may be composed from few or all of the 24 MSB bits of the full BS ID and few or all of the 24 LSB bits of the full BS ID, thereby enabling the common identifier to be implicitly derived from the full BS ID. This common identifier is referred to as the CSG ID.

One or more pre-designated bits in the CSG ID may be used to indicate the length of the CSG ID for different deployment scenarios. These bits are referred to as the CSG_Type bits.

The mapping of the CSG_Type bits to the length of CSG ID may be per Operator ID. The mapping of the CSG_Type bits to the length of CSG ID may be pre-provisioned or unicasted during initial network entry in an AAI_REG_RSP message. The information of which bits are designated as the CSG_Type bits may also be per Operator ID. The information of which bits are designated as the CSG ID may be per Operator ID. The information of which bits are designated as the CSG ID may be pre-provisioned or unicasted during initial network entry in the AAI_REG_RSP message. Multiple Operator IDs may have the same mapping information. Herein, if such information is not signaled by the BS then the MS may assume specified default values.

In one exemplary implementation, in a IEEE 802.16m communication system, the common identifier may be composed from few or all of the 24 MSB bits of the full BS ID and few or all of the 24 LSB bits of the full BS ID, thereby enabling the common identifier to be implicitly derived from the full BS ID. This common identifier is referred to as the CSG ID. Besides these, the CSG ID may optionally contain all the bits of a reduced common identifier signaled/broadcasted by the FBS. This reduced common identifier denotes an extra part that is transmitted, such as a CSGID_MSB, which may be the additional MSB attached to the CSG ID to make the CSG ID longer.

One or more pre-designated bits in the CSG ID may be used to indicate the length of the CSG ID for different deployment scenarios. These bits are referred to as the CSG_Type bits.

The mapping of the CSG_Type bits to the length of CSG ID and the information of which bits are designated as the CSG_Type bits may be per Operator ID. The information of which bits are designated as the CSG ID or the rule of how the CSG ID is constructed may be per Operator ID. Multiple Operator IDs can have the same mapping information. The information should be signaled to the MS and stored in the MS, e.g., in the whitelist at the MS. This signaling may be done in a broadcast manner, a unicast manner, or may be pre-provisioned. As an example, this information may be unicasted during initial network entry in an AAI_REG_RSP massage. The information on how to construct the CSG ID, or the rule of constructing the CSG ID from the full BS ID, etc., can be stored in the whitelist at the MS.

Default values for the mapping of the CSG_Type bits to the length of CSG ID and the information of which bits are designated as the CSG_Type bits or the default rule of how the CSG ID is constructed may be specified and used by the MS if the BS has not signaled this information.

Figure 7:
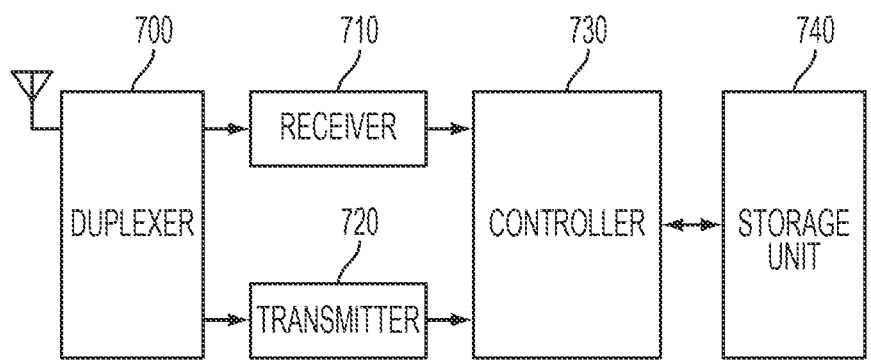
FIG. 7 is a block diagram illustrating an MS in a wireless communication system according to an exemplary embodiment of the present invention.

FIG. 7 is a block diagram illustrating an MS in a wireless communication system according to an exemplary embodiment of the present invention.

Referring to FIG. 7, the MS includes a duplexer 700, a receiver 710, a transmitter 720, a controller 730, and a storage unit 740. The MS may include any number of additional structural elements. However, a description of additional structural elements of the MS is omitted for conciseness.

The duplexer 700 transmits a transmission signal provided from the transmitter 720 via an antenna, and provides a reception signal from the antenna to the receiver 710 according to a duplexing scheme.

The receiver 710 converts the reception signal provided from the duplexer 700 into a baseband signal, and provides the baseband signal to the controller 730. For example, when the wireless communication system uses an OFDM scheme, the receiver 710 includes a Radio Frequency (RF) processor, an Analog/Digital Converter (ADC), an OFDM demodulator, and a decoder. Accordingly, the RF processor converts an RF signal provided from the duplexer 700 into a baseband analog signal. The ADC converts the analog signal provided from the RF processor into digital sample data. The OFDM demodulator transforms sample data in a time domain provided from the ADC into data in a frequency domain by performing a Fast Fourier Transform (FFT). The decoder demodulates and decodes a signal provided from the OFDM demodulator according to a Modulation and Coding Scheme (MCS) level.

The controller 730 controls overall operations of the MS. The operations of MS include any of the operations explicitly or implicitly described above as being performed by an MS, such as MS 140. For example, the controller 730 may control the receiver 710 and transmitter 720.

The transmitter 720 converts a transmission signal into an RF signal, and provides the RF signal to the duplexer 700 under control of the controller 730. For example, when the wireless communication system uses an OFDM scheme, the transmitter 720 includes an encoder, an OFDM modulator, a Digital/Analog Converter (DAC) and an RF processor. The encoder encodes and modulates a transmission signal according to an MCS level under control of the controller 730. The OFDM modulator converts data in the frequency domain provided from the encoder into sample data (i.e., an OFDM symbol) in a time domain by performing an Inverse FFT (IFFT). The DAC converts sample data provided from the OFDM modulator into an analog signal. The RF processor converts a baseband analog signal provided from the DAC into an RF signal.

The storage unit 740 stores programs required for overall operations of the MS and various data, including any of the information and/or the algorithms discussed herein as being received, transmitted, retained or used by an MS.

Figure 8:
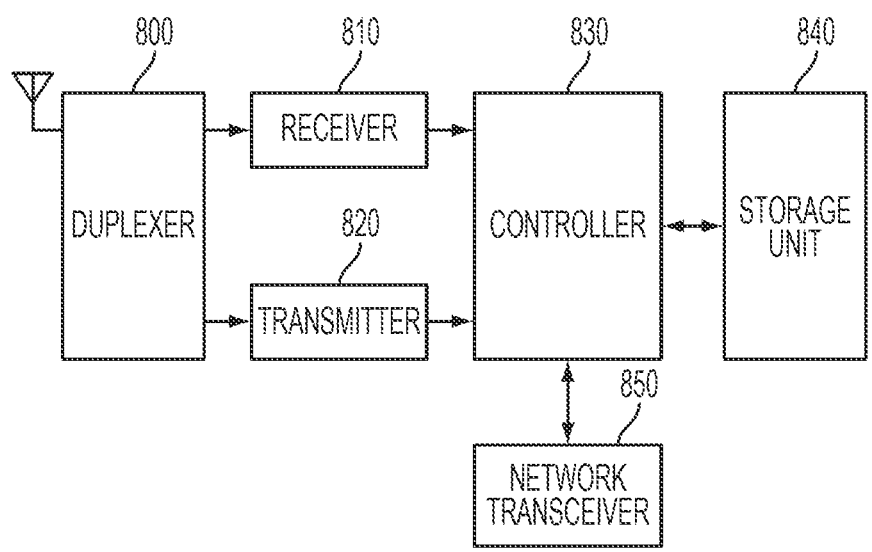
FIG. 8 is a block diagram illustrating a BS in a wireless communication system according to an exemplary embodiment of the present invention.

FIG. 8 is a block diagram illustrating a BS in a wireless communication system according to an exemplary embodiment of the present invention.

Referring to FIG. 8, the BS includes a duplexer 800, a receiver 810, a transmitter 820, a controller 830, a storage unit 840, and a network transceiver 850. The BS may include any number of additional structural elements. However, a description of additional structural elements of BS is omitted for conciseness. The BS may be any type of BS including a Relay, a Picocell, a Microcell, a Femtocell, a Ubicell, etc.

The duplexer 800 transmits a transmission signal provided from the transmitter 820 via an antenna, and provides a reception signal from the antenna to the receiver 810 according to a duplexing scheme.

The receiver 810 converts a reception signal provided from the duplexer 800 into a baseband signal and provides the baseband signal to the controller 830. For example, when the wireless communication system uses an OFDM scheme, the receiver 810 includes an RF processor, an ADC, an OFDM demodulator and a decoder. The RF processor converts an RF signal provided from the duplexer 800 into a baseband analog signal. The ADC converts the analog signal provided from the RF processor into digital sample data. The OFDM demodulator converts sample data in the time domain provided from the ADC into data in the frequency domain by performing FFT. The decoder demodulates and decodes a signal provided from the OFDM demodulator according to an MCS level.

The controller 830 controls overall operations of the BS. The operations of the BS include any of the operations explicitly or implicitly described above as being performed by a BS, such as an FBS. For example, the controller 830 may control the receiver 810 and the transmitter 820.

The transmitter 820 converts a transmission signal into an RF signal and provides the RF signal to the duplexer 800 under control of the controller 830. For example, when the wireless communication system uses an OFDM scheme, the transmitter 820 includes an encoder, an OFDM modulator, a Digital/Analog Converter (DAC) and an RF processor. The encoder encodes and modulates a transmission signal according to an MCS level under control of the controller 830. The OFDM modulator converts data in the frequency domain provided from the encoder to sample data (i.e., an OFDM symbol) in the time domain by performing IFFT. The DAC converts sample data provided from the OFDM modulator into an analog signal. The RF processor converts a baseband analog signal provided from the DAC into an RF signal.

The storage unit 840 stores programs required for overall operations of the BS and various data including any of the information and/or algorithms discussed herein as being received, transmitted, retained or used by a BS, such as an FBS.

The network transceiver 850 facilities communication with at least one of other BSs and a CN of a wireless communication system, such as a wireless communication system operating according to the IEEE 802.16m or 3GPP LTE standards. When the BS is a FBS the network transceiver 850 may be a broadband transceiver.

Certain aspects of the present invention may also be embodied as computer readable code on a computer readable recording medium. A computer readable recording medium is any data storage device that can store data, which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. For use in a wireless communication network comprising a plurality of Base Stations (BSs) capable of communicating with a plurality of Mobile Stations (MSs), wherein at least some of the BSs are Femtocell BSs (FBSs) and at least some of the BSs are Macrocell BSs (MBSs), a method for identifying the BSs at an MS, the method comprising:
    receiving at least one of a globally unique BS ID and an Operator ID from an FBS via a Broadcast CHannel (BCH);
    deriving a Closed Subscriber Group IDentifier (CSG ID) from the received at least one of the globally unique BS ID and the Operator ID; and
    determining, based on the derived CSG ID, if the FBS is a CSG FBS to which the MS is subscribed.

2. The method of claim 1, wherein the CSG ID is derived from the globally unique BS ID.

3. The method of claim 1, wherein the CSG ID is a part of the globally unique BS ID.

4. The method of claim 1, wherein the CSG ID includes the Operator ID and a part of the globally unique BS ID.

5. The method of claim 4, wherein the CSG ID comprises the full globally unique BS ID where the CSG comprises a single BS ID.

6. The method of claim 1, wherein the CSG ID is derived according to a rule stored at the MS.

7. The method of claim 6, wherein the rule is stored at the MS in a whitelist of IDs of FBSs to which the MS is subscribed.

8. The method of claim 6, wherein the rule is provided to the MS via at least one of pre-provisioning, unicast, and multicast.

9. The method of claim 6, wherein at least one of a selection of the rule and an application of the rule is based the Operator ID.

10. The method of claim 1, wherein the determining, based on the derived CSG ID, if the FBS is a CSG FBS to which the MS is subscribed comprises:
    determining if the derived CSG ID matches any CSG ID stored in a whitelist of IDs of FBSs to which the MS is subscribed; and
    if it is determined that the derived CSG ID matches a CSG ID stored in the whitelist, determining that the FBS is a CSG FBS to which the MS is subscribed.

11. The method of claim 10, wherein the determining if the derived CSG ID matches any CSG ID stored in the whitelist comprises:
    determining if some portion of the at least one of the derived CSG ID and the globally unique BS ID does not match any CSG ID or globally unique BS ID included in the whitelist; and
    if it is determined that some portion of the at least one of the derived CSG ID and the globally unique BS ID does not match any CSG ID or globally unique BS ID included in the whitelist, determining that the FBS is not a CSG FBS to which the MS is subscribed.

12. The method of claim 1, wherein the CSG ID is unique within an Operator ID.

13. A Mobile Station (MS) for use in a wireless communication network comprising a plurality of Base Stations (BSs) capable of communicating with the MS and other MSs, wherein at least some of the BSs are Femtocell BSs (FBSs) and at least some of the BSs are Macrocell BSs (MBSs), the MS comprising:
- a receiver for receiving signals from at least one of the BSs;
- a transmitter for transmitting signals to at least one of the BSs; and
- a controller for controlling to receiver at least one of a globally unique BS ID and an Operator ID from an FBS via a Broadcast CHannel (BCH), for controlling to derive a Closed Subscriber Group IDentifier (CSG ID) from the received at least one of the globally unique BS ID and the Operator ID, and for controlling to determine, based on the derived CSG ID, if the FBS is a CSG FBS to which the MS is subscribed.

14. The MS of claim 13, wherein the controller controls to derive the CSG ID from the globally unique BS ID.

15. The MS of claim 13, wherein the CSG ID is part of the globally unique BS ID.

16. The MS of claim 13, wherein the CSG ID includes the Operator ID and a part of the globally unique BS ID.

17. The MS of claim 16, wherein the part of the globally unique BS ID comprises a Least Significant Bit (LSB) of the globally unique BS ID.

18. The MS of claim 13, further comprising a memory that sores a rule for deriving the CSG ID,
wherein the controller controls to derive the CSG ID according to the stored rule.

19. The MS of claim 18, wherein the rule is stored in the memory in a whitelist of IDs of FBSs to which the MS is subscribed.

20. The MS of claim 18, wherein the rule is provided to the MS via at least one of pre-provisioning, unicast, and multicast.

21. The MS of claim 18, wherein the controller, at least one of controls a selection of the rule and controls an application of the rule, based the Operator ID.

22. The MS of claim 13, wherein the controller, when controlling to determine, based on the derived CSG ID, if the FBS is a CSG FBS to which the MS is subscribed, controls to determine if the derived CSG ID matches any CSG ID stored in a whitelist of IDs of FBSs to which the MS is subscribed, and if the controller determines that the derived CSG ID matches a CSG ID stored in the whitelist, the controller controls to determine that the FBS is a CSG FBS to which the MS is subscribed.

23. The MS of claim 22, wherein the controller, when determining if the derived CSG ID matches any CSG ID stored in the whitelist, controls to determine if some portion of the at least one of the derived CSG ID and the globally unique BS ID does not match any CSG ID or globally unique BS ID included in the whitelist, and if the controller determines that some portion of the at least one of the derived CSG ID and the globally unique BS ID does not match any CSG ID or globally unique BS ID included in the whitelist, the controller controls to determine that the FBS is not a CSG FBS to which the MS is subscribed.

24. The MS of claim 13, wherein the CSG ID is unique within an Operator ID.

\* \* \* \* \*